United States Patent
Parviainen et al.

(10) Patent No.: US 9,943,464 B2
(45) Date of Patent: Apr. 17, 2018

(54) METHOD AND AN APPARATUS FOR USING A MEDICAL SYRINGE, AS WELL AS FOR DISSOLVING A PHARMACEUTICAL SUBSTANCE IN A LIQUID

(71) Applicant: NewIcon Oy, Kuopio (FI)

(72) Inventors: Ossi Parviainen, Kuopio (FI); Juha Laaksonen, Kuopio (FI)

(73) Assignee: NewIcon Oy, Kuopio (FI)

( * ) Notice: Subject to any disclaimer, the term of this patent is extended or adjusted under 35 U.S.C. 154(b) by 15 days.

(21) Appl. No.: 15/035,239

(22) PCT Filed: Nov. 6, 2014

(86) PCT No.: PCT/FI2014/050838
§ 371 (c)(1),
(2) Date: May 9, 2016

(87) PCT Pub. No.: WO2015/067855
PCT Pub. Date: May 14, 2015

(65) Prior Publication Data
US 2016/0287476 A1    Oct. 6, 2016

(30) Foreign Application Priority Data

Aug. 11, 2013    (FI) .................................... 20136102

(51) Int. Cl.
*A61J 1/16*    (2006.01)
*A61J 1/20*    (2006.01)
(Continued)

(52) U.S. Cl.
CPC ........... *A61J 1/2096* (2013.01); *A61J 1/1406* (2013.01); *A61J 1/1412* (2013.01); *A61J 1/16* (2013.01);
(Continued)

(58) Field of Classification Search
CPC .... A61J 1/16; A61J 1/20; A61J 1/1406; A61J 1/1412; A61J 1/2096; B01F 11/0008; B01F 11/0037
(Continued)

(56) References Cited

U.S. PATENT DOCUMENTS 5,431,201 A * 7/1995 Torchia ..................... A61J 1/20
141/100
5,479,969 A * 1/1996 Hardie .................... B65B 3/003
141/103
(Continued)

FOREIGN PATENT DOCUMENTS

EP        2511183 A1    10/2012
WO    2006124211 A2    11/2006
(Continued)

OTHER PUBLICATIONS

Search report of the corresponding European application 14860047.1, issued by European Patent Office dated May 15, 2017.
(Continued)

*Primary Examiner* — Timothy L Maust
(74) *Attorney, Agent, or Firm* — Berggren LLP

(57) ABSTRACT

The invention relates to a method for using a medical syringe, in which method the medical syringe comprises a cylinder part with retaining lugs or a retaining flange and a needle, and a plunger part which is movable within the cylinder part by moving the plunger rod extending outside the cylinder part with respect to the cylinder part, and the method comprising moving the plunger part with respect to the cylinder part by at least one industrial robot either outwards for drawing liquid into the medical syringe or inwards for injecting the liquid out of the medical syringe. In the method according to the invention, the plunger part is gripped with a gripper configured to prevent the plunger part from turning with respect to the gripper. The invention also (Continued)

relates to an apparatus for using a medical syringe, and a method and an apparatus for dissolving a pharmaceutical substance in a liquid by utilizing the method according to the invention for using a medical syringe.

15 Claims, 11 Drawing Sheets

(51) Int. Cl.
*A61J 1/14* (2006.01)
*B25J 11/00* (2006.01)
*B25J 15/00* (2006.01)
*B01F 11/00* (2006.01)
*B65B 3/00* (2006.01)

(52) U.S. Cl.
CPC ............. *A61J 1/20* (2013.01); *B01F 11/0008* (2013.01); *B01F 11/0037* (2013.01); *B25J 11/00* (2013.01); *B25J 11/009* (2013.01); *B25J 15/0066* (2013.01); *B65B 3/003* (2013.01)

(58) Field of Classification Search
USPC .......................................... 141/27, 319, 329
See application file for complete search history.

(56) References Cited

U.S. PATENT DOCUMENTS

| | | | |
|---|---|---|---|
| 5,805,454 A | 9/1998 | Valerino, Sr. | |
| 7,753,085 B2* | 7/2010 | Tribble | B65B 3/003 141/104 |
| 8,267,129 B2* | 9/2012 | Doherty | A61J 1/2096 141/1 |
| 8,271,138 B2* | 9/2012 | Eliuk | B66C 1/42 294/902 |
| 8,286,671 B1* | 10/2012 | Strangis | B65B 7/28 141/104 |
| 8,386,070 B2* | 2/2013 | Eliuk | A61J 1/20 141/1 |
| 2006/0259195 A1 | 11/2006 | Eliuk | |
| 2007/0125442 A1 | 6/2007 | Tribble | |
| 2008/0169045 A1 | 7/2008 | Tribble | |
| 2008/0260580 A1* | 10/2008 | Helle | A61J 1/20 422/63 |
| 2009/0038709 A1 | 2/2009 | VanVreeland | |

FOREIGN PATENT DOCUMENTS

| | | |
|---|---|---|
| WO | 2013021986 A1 | 2/2013 |
| WO | 2014054183 A1 | 4/2014 |

OTHER PUBLICATIONS

Search report of the proritty application, issued by Finnish Patent Office dated Aug. 7, 2014.

* cited by examiner

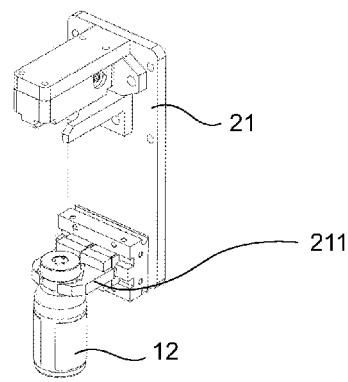
Fig. 7a
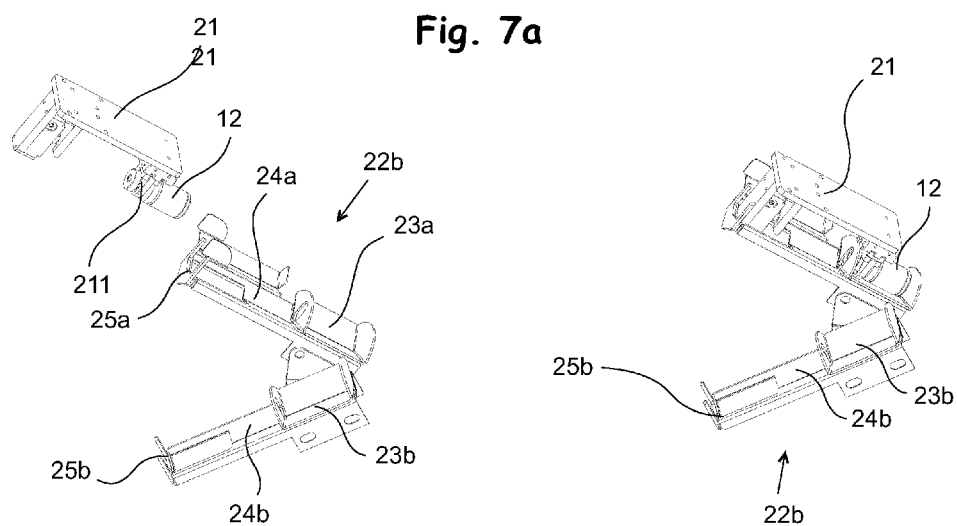
Fig. 7b
Fig. 7c

1

METHOD AND AN APPARATUS FOR USING A MEDICAL SYRINGE, AS WELL AS FOR DISSOLVING A PHARMACEUTICAL SUBSTANCE IN A LIQUID

PRIORITY

This application is a national application of PCT application PCT/FI2014/050838 filed on Nov. 6, 2014 and claiming priority of the Finnish national application number FI20136102 filed on Nov. 8, 2013, both of which are incorporated herein by reference.

FIELD OF THE INVENTION

The invention relates to a method and an apparatus for using a medical syringe. The invention also relates to a method and an apparatus for dissolving a pharmaceutical substance in a liquid.

BACKGROUND OF THE INVENTION

Many pharmaceuticals to be administered in liquid form via a syringe to a patient are delivered in the form of a dry substance to hospitals, because e.g. better stability of the pharmaceuticals is achieved in this way. However, a drug in the form of a dry substance has to be dissolved in a liquid at the hospital, e.g. if the drug is intended to be administered in liquid form via a medical syringe to a patient. Normally, the dissolving is done by filling liquid-proof dissolving receptacles closed by a cap and containing the pharmaceutical substance ready in powder form, with sterilized water in a content corresponding to the required mixing ratio, by the same medical syringe via which the pharmaceutical substance is to be administered to a patient later on. For this purpose, each dissolving receptacle contains the powdered/pulverized pharmaceutical substance dosed in a quantity that corresponds to the quantity of the liquid drug prescribed to the patient. After the addition of sterilized water, the dissolving receptacle is shaken in such a way that the powdered/pulverized pharmaceutical substance is mixed and dissolved in the added liquid. The shaking is performed for a suitable time in a continuous or, for example, intermittent manner by allowing the mixed solution that contains the powder to settle now and then. This step normally takes about 1 to 2 minutes, after which the mixture is still allowed to settle and become clearer in a slightly longer settling step. After this, the pharmaceutical substance is removed from the dissolving receptacle to the medical syringe by using the same needle with which the water was added to the dissolving receptacle. Next, the needle used in the mixing step is removed from the medical syringe and replaced by a sealed and sterile cap at the tip of the syringe. After this, the medical syringe is normally equipped with a label indicating the data of the recipient of the drug, as well as the name and the dose of the pharmaceutical substance to be administered. Finally, the medical syringe is placed in a location where a doctor or nurse delivering the drugs will pick up the ready-prepared medical syringe.

The manual preparation of medical syringes requires careful and precise handling of drug packages, dissolving receptacles and medical syringes, to prevent contamination of the pharmaceutical substance by viruses and bacteria. The preparing person should, for example, ensure proper disinfection of his/her hands before handling drug packages, dissolving receptacles and medical syringes. In a large hospital, it may be necessary to prepare hundreds of such medical syringes daily; consequently, the manual dissolving requires the labour input of several persons. To alleviate this situation, fully automatic apparatuses have recently entered the market, for dissolving a powdered or pulverized pharmaceutical substance in a liquid (sterilized water) and for preparing medical syringes ready without manual work. One such apparatus of prior art typically comprises a weighing device, a device for adding a solution, a mixing device, a device for filling a syringe, a device for removing a needle used for filling a syringe, a device for fastening a cap to the tip of a syringe, as well as a device for attaching a label to a syringe. For transferring a dissolving receptacle and a syringe from one device to another, an industrial robot is used which applies its gripper to grip a receptacle and a syringe to be transferred from one device to another, and places and holds them in a desired location, if necessary. The robot also applies the medical syringe, that is, moves the plunger part of the medical syringe in a given direction with respect to its cylinder part.

In methods and apparatuses of prior art for automatic dissolving of powdered or pulverized pharmaceuticals and for preparation of medical syringes, a number of separate devices are used for implementing the handling steps, each device having a specific function. Moreover, these apparatuses function slowly, because the application of the medical syringes, i.e. the moving of the plunger part of the medical syringe with respect to the cylinder part, is implemented by all too clumsy and slowly operating special equipment. In addition, the methods and apparatuses of prior art are inefficient, because they are capable of handling only one dissolving receptacle and one medical syringe at a time.

BRIEF SUMMARY OF THE INVENTION

It is an aim of the invention to provide a method for using a medical syringe, by which the application of the medical syringe becomes more convenient, smoother and faster than before. It is also an aim of the invention to provide an apparatus for dissolving a pharmaceutical substance, provided in a powdered or pulverized or corresponding solid form, in a liquid, and for preparing medical syringes that contain the dissolved pharmaceutical substance, in a more efficient and cost-effective way than before. Furthermore, it is an aim of the invention to provide an apparatus according to the method of the invention.

The aim of the invention is achieved because in the method according to the invention, medical syringes are applied by an industrial robot that grips the medical syringe at its plunger part in such a way that the plunger part cannot rotate with respect to the gripper, at least not in relation to an axis transverse to the longitudinal axis of the plunger part of the medical syringe. Thus, in the simplest case, it is sufficient that the cylinder part is only supported at a retaining collar therein to a retaining member, whereby it is possible to avoid such steps of handling the medical syringe in which the cylinder part is gripped by a gripper to keep it in place during the use of the medical syringe. To put it more precisely, the method and the apparatus according to the invention for using a medical syringe are characterized in what will be presented in claim 1 and claim 7, respectively. Dependent claims 2 to 6 present some advantageous embodiments of the method according to the invention, and dependent claims 8 to 10 present some advantageous embodiments of the apparatus according to the invention. The method according to the invention for dissolving a powdered or pulverized pharmaceutical substance in a liquid is characterized in what will be presented in claim 11, and the apparatus for implementing this method is characterized in what will be presented in claim 14.

The method and the apparatus according to the invention have the advantage that the automated use of medical syringes becomes more efficient and the apparatus required for it becomes simpler. Furthermore, thanks to the method and the apparatus according to the invention for dissolving a powdered or pulverized pharmaceutical substance in a liquid, the powdered or pulverized pharmaceutical substance can be dissolved in a liquid in an automated manner, more efficiently, and at lower costs than before.

DESCRIPTION OF THE DRAWINGS

In the following, the invention will be described in more detail with reference to the appended drawings, in which FIGS. 7a to 7c show steps of transferring a mixing receptacle to a mixing receptacle holder in the apparatus, by the apparatus of FIG. 6, FIGS. 8a to 8c show steps of filling a medical syringe by the apparatus of FIG. 6, FIGS. 9a to 9c show steps of filling a mixing receptacle with sterile water by using the apparatus of FIG. 6, and FIGS. 10a to 10c show steps of drawing the mixed pharmaceutical substance back into the medical syringe by using the apparatus of FIG. 6.

DETAILED DESCRIPTION OF THE INVENTION

Figure 1:
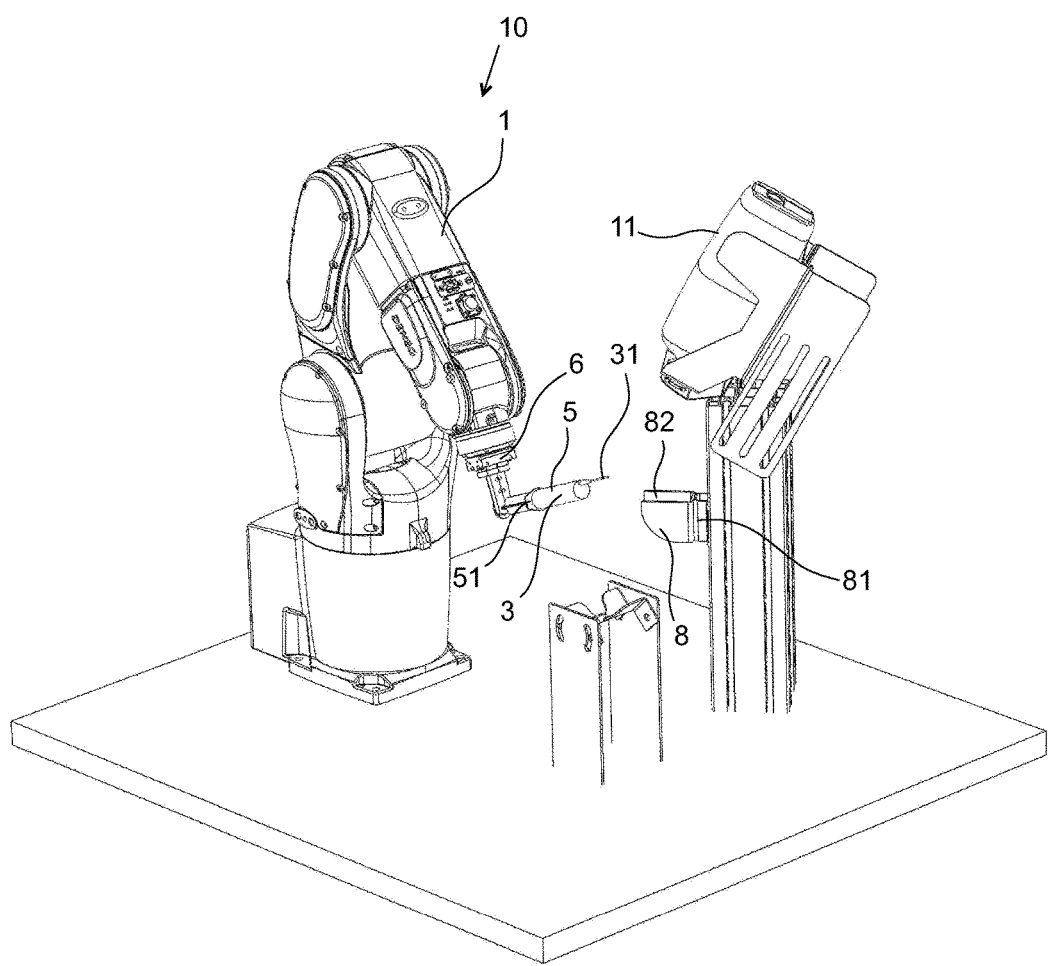
FIG. 1 shows a general view of an apparatus according to the invention for using a medical syringe.

FIG. 1 shows an apparatus according to the invention, suitable for using medical syringes, i.e. an apparatus 10 for moving the plunger part 4 of a medical syringe 3 with respect to the cylinder part 5 of the medical syringe. The medical syringes 3 used by the apparatus 10 are conventional medical syringes which are used for treating people in e.g. hospitals and health clinics, are made of e.g. plastic or corresponding material, and typically comprise a cylinder and a plunger arranged therein and moved back and forth within the cylinder by means of a plunger rod extending outside the cylinder at its one end, and a drive flange at the end of the plunger rod. In the present application, the plunger and the related plunger rod are called the plunger part 4; and the cylinder, a gripping member (normally a flange or e.g. lugs spaced from each other) at the first end of the cylinder and the injection end equipped with an injection opening at its second end (to which the needle of the medical syringe is fastened) are called the cylinder part 5. Consequently, above and also elsewhere in this application, the use of the medical syringe is presented so that it refers to the movement of the plunger part 4 with respect to the cylinder part 5.

The apparatus 10 shown in FIG. 1 comprises an industrial robot 1 which is, for example, a so-called articulated robot with six degrees of freedom. The gripper 6 of this robot 1 comprises fingers 7 for gripping the plunger part 4 of a medical syringe, at the drive flange 42 at the end of its plunger rod 41, so that the medical syringe 3 cannot rotate or move with respect to the gripper when the fingers 7 of the gripper 6 are pressed against the drive flange of the medical syringe. To achieve this, two fingers 7 of the gripper 6, which are movable against each other, are provided with central flange grooves 71, in which the drive flange 42 at the end of the plunger rod 41 is received when the fingers 7 are moved against each other. Thanks to the flange grooves 71, the drive flange 42 at the end of the plunger rod 41 and thereby the plunger rod 41 cannot rotate with respect to the gripper 6 in the direction of the plane parallel to the longitudinal direction of the plunger rod 41; in other words, the medical syringe 3 remains in a relatively transverse position with respect to the direction of pressing of the fingers 7 of the gripper 6 of the robot 1. Moreover, rotation in the direction of a plane transverse to this (i.e. the plane parallel to the flange at the end of the plunger rod) is prevented by frictional forces caused on the flange at the end of the plunger rod by the fingers 7. Nevertheless, for using the medical syringe by such an apparatus, it will be sufficient that the plunger rod 41 (and thereby the plunger part 4) cannot turn in the direction of the plane parallel to the longitudinal direction of the plunger part 4.

A particular retaining member 8 is provided for holding the cylinder part 5 of the medical syringe in place in the apparatus 10. In this embodiment, the retaining member is, for example, a U-shaped plate with a web 81 and two parallel flanges 82 extending from it in a transverse direction. When the cylinder part 5 is supported to the retaining member 8, retaining lugs 51 (or a solid retaining flange) at the end of the cylinder part 5 on the side of the plunger rod 41 are placed against the flanges 82 of the retaining member 8, as shown in FIGS. 2b and 2c. The retaining member 8 shown in FIGS. 2a to 2c is only intended for pulling out the plunger part 4 of the medical syringe 3, because the apparatus of FIGS. 2a to 2c is only intended to enable the pulling out of the plunger part 4 of the medical syringe 3 when liquid is drawn from a liquid receptacle (such as an infusion bag 11) into the medical syringe 3.

Figure 2A:
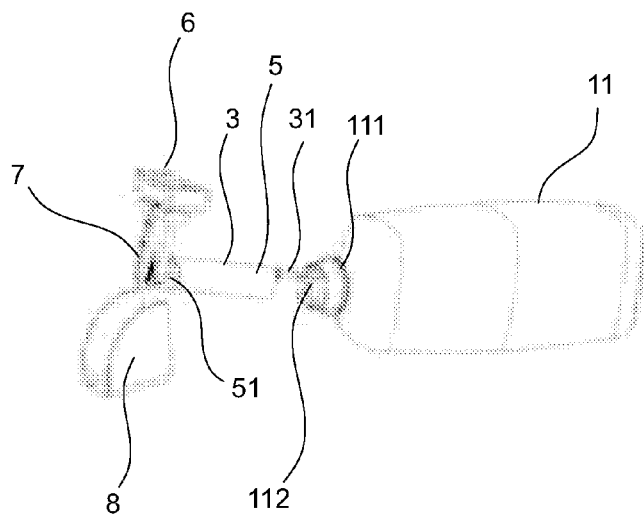
FIGS. 2a to 2c show steps of filling the medical syringe with sterile water by using the apparatus of FIG. 1, FIGS. 3a to 3c show steps of filling a mixing receptacle with sterile water by using the apparatus of FIG. 1, FIGS. 4a to 4c show steps of drawing the mixed pharmaceutical substance back into the medical syringe by using the apparatus of FIG. 1, FIGS. 5a and 5b show the removal of the needle from the syringe by a needle removing device in the apparatus according to FIGS. 3a to 3c and 4a to 4c.
Figure 2B:
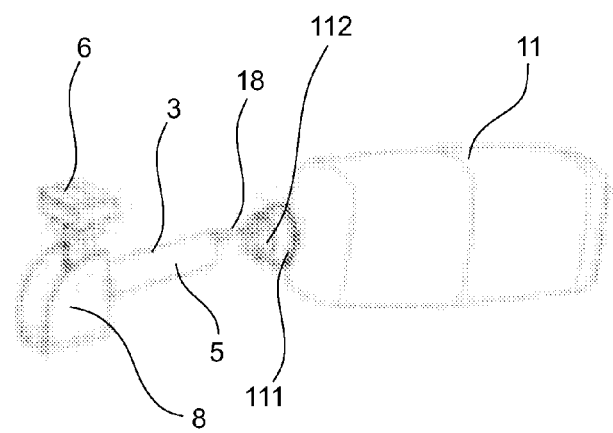
Figure 2C:
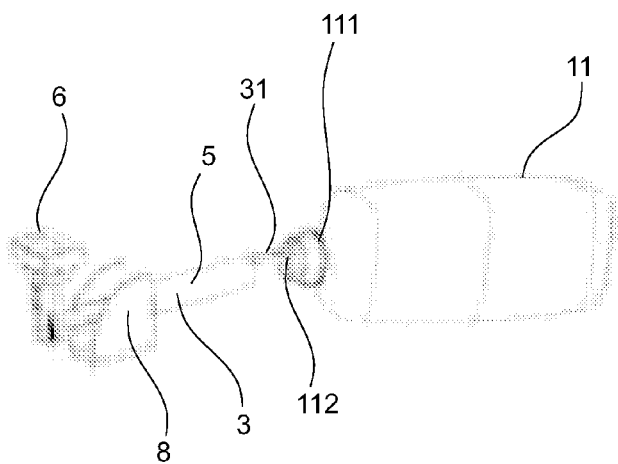

FIGS. 2a to 2c show how the plunger part 4 of the medical syringe is pulled out by the robot 1 when liquid is drawn into the medical syringe from an infusion bag. This takes place in the following steps:

the medical syringe 3, its entire plunger part 4 being inserted within the cylinder part 5, is brought to the vicinity of a puncturing point 112 in the cap 111 of the infusion bag 11 held by the gripper 6 of the robot 1, so that the needle 31 of the medical syringe 3 abuts the puncturing point and the medical syringe 3 is in an inclined position so that the retaining lugs 51 of its cylinder part 5 do not hit the retaining member 8;

the medical syringe is moved in the direction of the puncturing point so that the needle punctures the puncturing point 112 in the cap 111 of the infusion bag 11 in the way shown in FIG. 2a;

the medical syringe 3 is turned by moving the arm of the robot 1 downwards so that the retaining lugs 51 of the cylinder part 5 are turned behind the flanges 81 and 82 of the retaining member 8 as shown in FIG. 2b;

the plunger part 4 is moved outwards, wherein the retaining lugs 51 of the cylinder part 5 are supported to the flanges 82 of the retaining member 8, wherein the plunger part 4 moves with respect to the cylinder part 5 to the position shown in FIG. 2c so that a given quantity of liquid is transferred from the infusion bag 11 into the cylinder part 5 along the injection channel in the needle 31 of the medical syringe;

finally, the medical syringe is turned upwards to the position shown in FIG. 2a, from which the needle 31 can be pulled out of the infusion bag, after which the medical syringe 3 can be transferred to a given location by moving the arm of the robot.

Figure 3A:
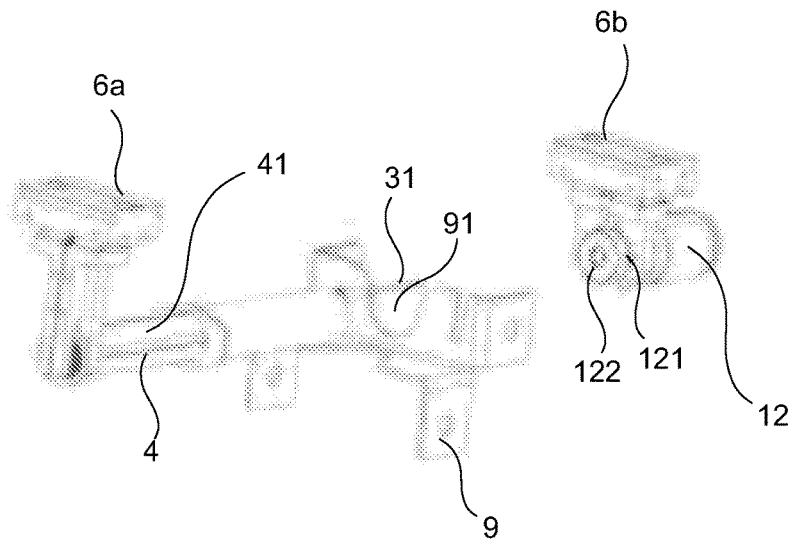
Figure 3B:
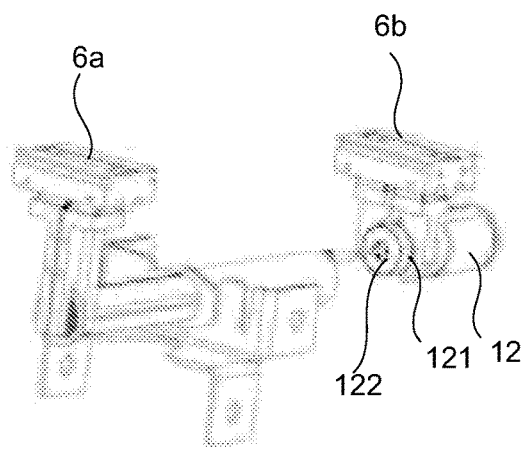
Figure 3C:
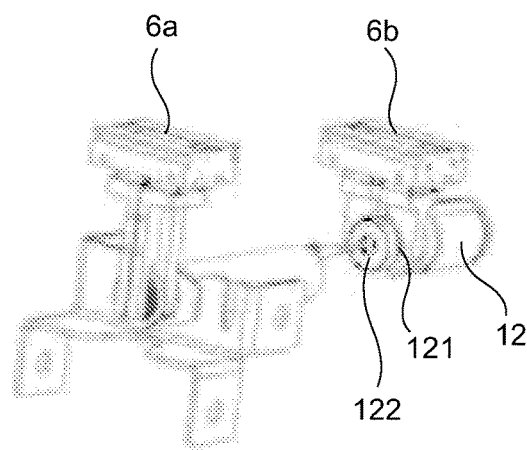

FIGS. 3a to 3c show a part of the apparatus 10, by which the liquid in the medical syringe 3 can be injected, by moving the plunger part 4 of the medical syringe 3 with respect to the cylinder part 5, into a mixing receptacle 12 (e.g. a flask) equipped with a puncturable cap 121, and drawn back into the medical syringe by means of robots 1 and 2. Here, a retaining member different from the retaining member of FIGS. 2a to 2c is used for keeping the cylinder part in place. The retaining member 9 shown in FIGS. 3a to 3c can also be a piece made of e.g. a metal plate. The functional difference to the retaining member of FIGS. 2a to 2c is the fact that it can be used for both pulling the plunger part 4 of the medical syringe outwards and pushing it inwards, while the robot 1 is used for gripping the plunger part 4 of the medical syringe only. This is implemented in such a way that the retaining member 9 of FIGS. 3a to 3c comprises a U-shaped groove 91, as shown in the figures, into which groove the medical syringe 3 can be inserted from one direction (normally from above) so that the retaining lugs (or the retaining flange) 51 in the cylinder part 5 of the medical syringe remain on either side of the plate 92 surrounding the U-shaped groove 91, depending on whether the plunger part 4 is to be moved inwards or outwards with respect to the cylinder part 5. The width of the U-shaped groove 91 is such that the retaining member 9 does not compress the cylinder part 5 of the medical syringe 3 but does prevent it from moving in a direction transverse to the longitudinal direction of the U-shaped groove 91 (i.e. normally in the horizontal direction). Furthermore, the U-shaped groove 91 naturally supports the medical syringe 3 in the direction of the bottom of the U-shaped groove 91 (i.e. normally from below) when the medical syringe 3 is fitted at the bottom of the U-shaped groove 91. Thus, the retaining member 9 allows the movement of the medical syringe 3 in its longitudinal direction so that the retaining lugs 51 of the cylinder part move away from the sheet material 92 surrounding the U-shaped groove 91 and away from the bottom of the U-shaped groove 91 in the direction of the U-shaped groove 91 (i.e. normally upwards). Furthermore, the part of the apparatus 10 shown in FIGS. 3a to 3c comprises a gripper 6 according to FIGS. 2a to 2c fastened to the arm of the first industrial robot 1, and a gripper 18 fastened to the arm of the second industrial robot 2 and designed for gripping the mixing receptacle 12 as shown in FIGS. 3a to 3c.

Injecting the liquid from the medical syringe into the mixing receptacle, shown in FIGS. 3a to 3c, comprises the following steps:

the medical syringe 3 whose plunger part 4 is pulled out (over a distance required for the desired quantity of liquid) is brought by the gripper 6 of the first robot 1 to the vicinity of a puncturing point 122 in the cap 121 of the receptacle 12 in the gripper 18 of the second robot, the medical syringe 3 is moved by the first robot 1 and placed in the U-shaped groove 91 in the retaining member 9, as shown in FIGS. 3a and 3b, so that the retaining member 9 is on the same side of the retaining members 51 of the cylinder part 5 as the needle 52, the mixing receptacle 12 is moved by the second robot 2 in the direction of the retaining member 9 so that the needle 31 of the medical syringe 3 punctures the puncturing point 122 in the cap 121 of the receptacle 12 as shown in FIG. 3a and extends into the mixing receptacle 9, the medical syringe 3 is moved by the first robot 1 towards the retaining member, wherein the retaining lugs 51 of the cylinder part 5 are supported to the edges of the U-shaped groove 91 of the retaining member 9, and the plunger part 4 is moved with respect to the cylinder part 5 from the position of FIG. 3b to the position of FIG. 3c, wherein the liquid is transferred from the medical syringe 3 into the mixing receptacle 12, the medical syringe 3 is moved away (backwards) from the retaining member 9 and the mixing receptacle 12 to such an extent that the needle 31 comes out of the mixing receptacle 12, the medical syringe 3 is moved further backwards or lifted upwards so that the medical syringe 3 is no longer in the U-shaped groove 91 of the retaining member 9, after which the medical syringe 3 can be moved freely by the first robot 1, held at the plunger part 4, to a desired position.

Figure 4A:
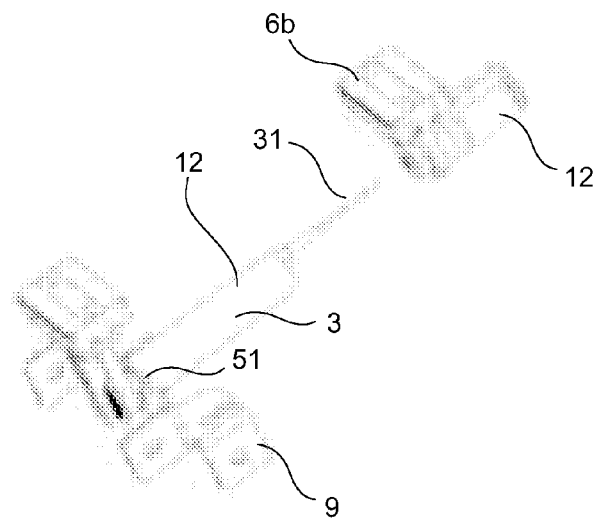
Figure 4B:
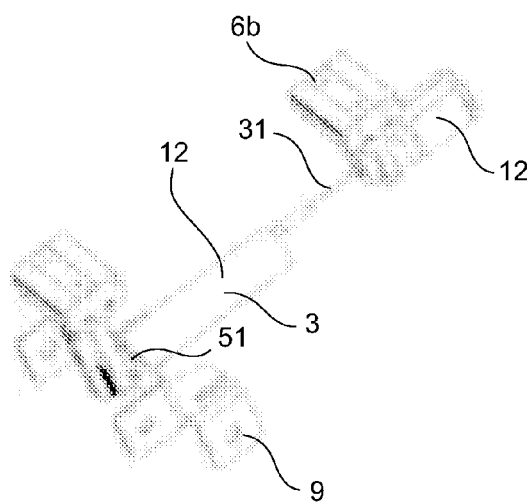
Figure 4C:
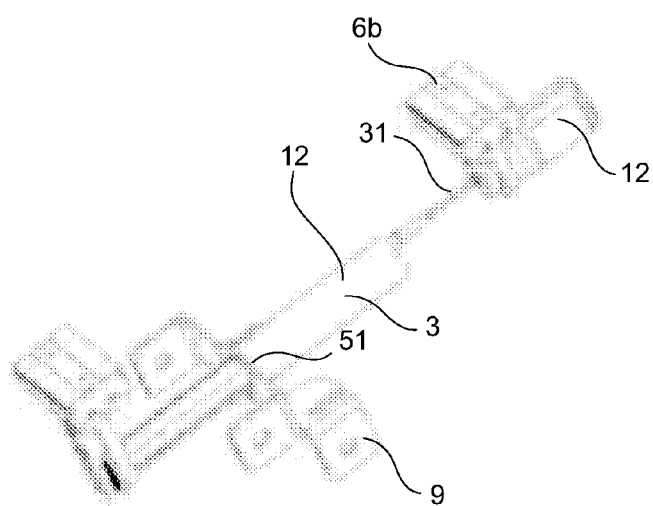

FIGS. 4a to 4c show transfer (drawing) of liquid from the mixing receptacle by applying a part of the apparatus 10 similar to that shown in FIGS. 3a to 3c, by a movement of the plunger part 4 of the medical syringe 3, from the mixing receptacle 12 back into the medical syringe 3 (e.g. after dissolving a pharmaceutical substance, or the like, in the mixing receptacle 12). It comprises the following steps:

the medical syringe 3 whose plunger part 4 is fully inserted inside the cylinder part 5 is brought by the gripper 6 of the first robot 1 to the vicinity of the fixed retaining plate 9 and the puncturing point 122 in the cap 121 of the mixing receptacle 12 in the gripper 18 of the second robot 2, the medical syringe 3 is moved by the first robot 1 and placed in the U-shaped groove 91 in the retaining member 9, as shown in FIGS. 3a and 3b so that the retaining member 9 is on the same side of the retaining members 51 as the plunger rod 41, the mixing receptacle 12 is moved and, if necessary, turned slightly in the direction of the retaining member 9 by the second robot 2 so that the needle 31 punctures the puncturing point 122 in the cap 121 of the mixing receptacle 12 and extends to the lower corner between the bottom and the side wall of the mixing receptacle 12, as shown in FIG. 4a, the medical syringe 3 is moved by the first robot 1 away from the retaining member 9, wherein the retaining lugs 51 of the cylinder part 5 are supported to the edges of the U-shaped groove 91 of the retaining member 9, and the plunger part 4 moves with respect to the cylinder part 5 from the position of FIG. 4b to the position of FIG. 4c, wherein the liquid is transferred from the mixing receptacle 12 into the medical syringe 3 by the underpressure formed in the cylinder part 5, the medical syringe 3 is moved away (backwards) from the retaining member 9 and the mixing receptacle 12 to such an extent that the needle 31 comes out of the mixing receptacle 12, the medical syringe 3 is moved further backwards or lifted upwards so that the medical syringe 3 is no longer in the U-shaped groove 91 of the retaining member 9, after which the medical syringe 3 can be moved freely by the first robot 1, held at the plunger part 4, to a desired position.

Figure 5A:
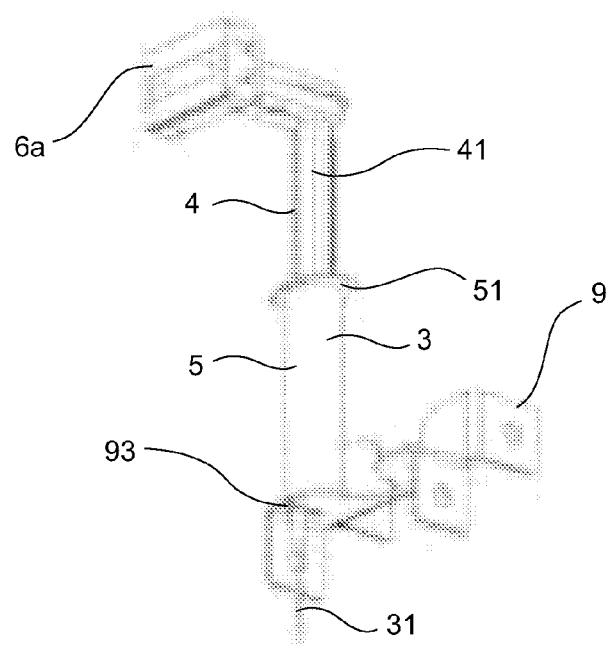
Figure 5B:
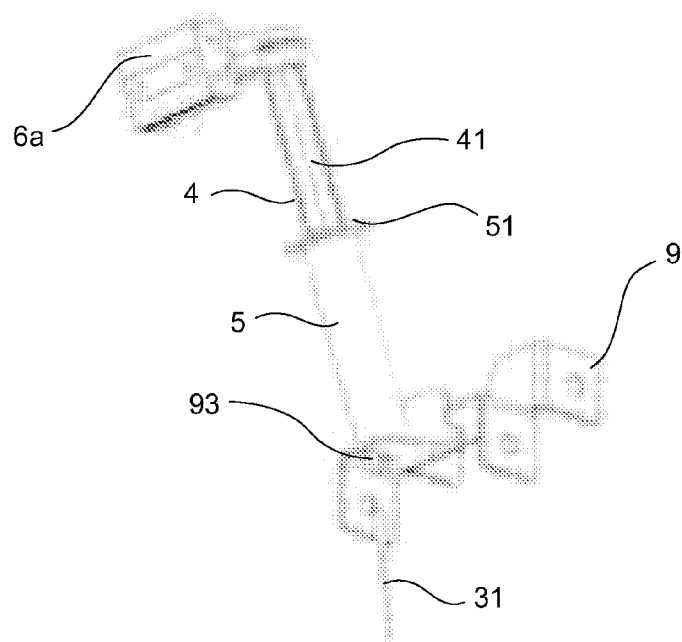

FIGS. 5a and 5b show the part of the apparatus 10, by which the needle 31 is removed from the tip of the medical syringe 3 by using the industrial robot 1. It comprises a needle removing member which, in the embodiment of FIGS. 5a and 5b, is a hole or slot 93 provided at a suitable point in the retaining member 9 of FIGS. 3a to 3c and 4a to 4c and in which the needle 52 can be inserted so that it can be removed by suitably turning the medical syringe 3 and moving it backwards as shown in FIGS. 5a and 5b.

Figure 6:
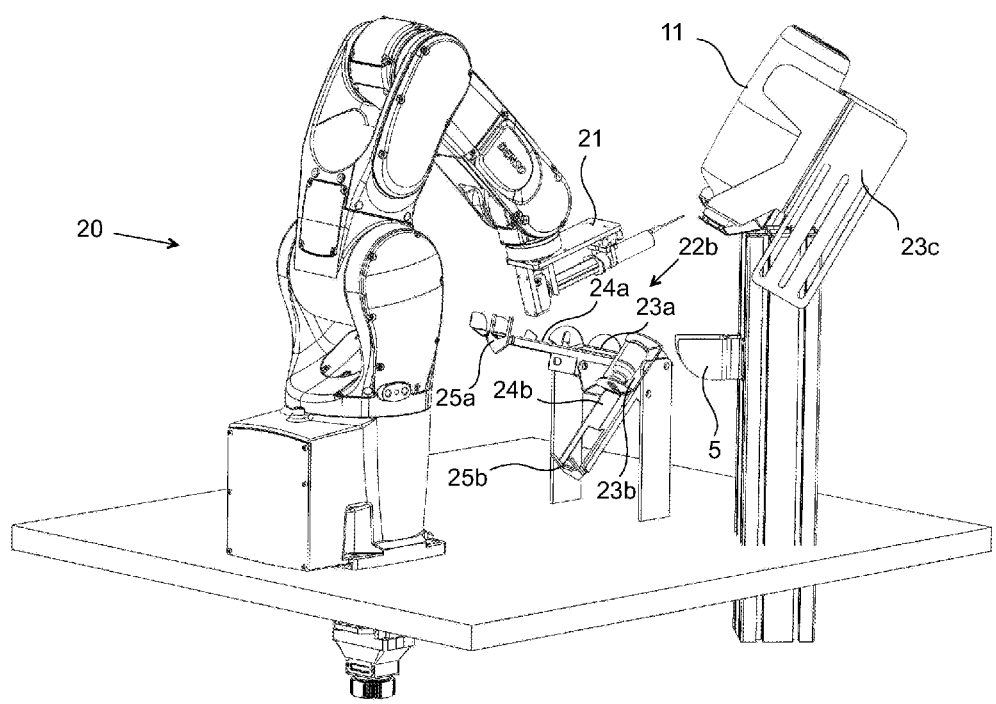
FIG. 6 shows a general view of another apparatus according to the invention for using a medical syringe.

FIG. 6 shows another apparatus 20 according to the invention for using medical syringes 3. This apparatus, too, comprises a gripper 21 to be fastened to the arm of an industrial robot (not shown in the figures), and at least two different retaining members 22a and 22b, the first 22a of which can be used for filling a medical syringe with a liquid to be used for dissolving (that is, e.g. with sterilized water), and the second 22b for adding this liquid to a mixing receptacle 12 that contains powdered or pulverized pharmaceutical substance, and for drawing the mixed liquid pharmaceutical solution from the mixing receptacle 12 back to the medical syringe. In this apparatus, the retaining member 22a and the retaining member 22b are typically mounted in a fixed position, but one or both of them can also be fastened to the arm of a possible other industrial robot, or to a gripper in the arm.

The gripper 21 in this apparatus, as well as the gripper 6 of the apparatus shown in FIG. 1, is configured to prevent the plunger part of the medical syringe from turning in the direction of the plane parallel to the longitudinal direction of the plunger part, with respect to the gripper. However, a difference to the gripper 6 of FIG. 1 is, among other things, the fact that the gripper of this apparatus is provided with guiding jaws 211 which can be placed around the cylinder part 5 of the medical syringe 3 so that they do not compress the cylinder part 5 but support it so that the movement of the tip of the medical syringe 3 in the lateral directions is prevented.

FIGS. 7a to 7c, 8a to 8c, 9a to 9c, and 10 to 10c show the dissolving of a powdered or pulverized pharmaceutical substance in a liquid (in this case, sterilized water) by means of the apparatus 20 of FIG. 6.

FIGS. 7a to 7c show how the gripper 21 of the apparatus 20 according to FIG. 6 can be used to move a mixing receptacle 12 of the type shown in FIGS. 2a to 2c, 3a to 3c, and 4a to 4c, by means of the guiding jaws 211 of the gripper 21 to the retaining member 22b of the apparatus 20, provided with a filling holder 23a in which the mixing receptacle 12 can be placed for the time of filling the same, and an emptying holder 23b in which the mixing receptacle 12 can be placed when the ready mixed solution is removed from the mixing receptacle 12. On the front side, each holder 23a, 23b is provided with a respective support 24a, 24b whose end is equipped with a U-shaped groove 25a and 25b, against which the retaining collar or the retaining lugs 51 of the cylinder part 5 of the medical syringe 3 can be placed so that the cylinder part 5 of the medical syringe 3 remains in place when the plunger part 4 is moved by the gripper 21 with respect to the cylinder part 5. The U-shaped grooves 25a and 25b in the retaining member 22b are, as such, similar to those in the retaining member 9 presented in the embodiment of FIGS. 3a to 3c and 4a to 4c. In this embodiment, the function of the separate filling holder 23a and emptying holder 23b is to place the mixing receptacle 12 in various positions which are as advantageous as possible in view of the filling and the emptying, in the way shown in the figures. As shown in FIG. 7a, the guiding jaws 211 of the gripper 21 are used for gripping the mixing receptacle 5 at its neck and for transferring it to the filling holder 23a of the retaining member 22b, as shown in FIGS. 7b and 7c.

Figure 8A:
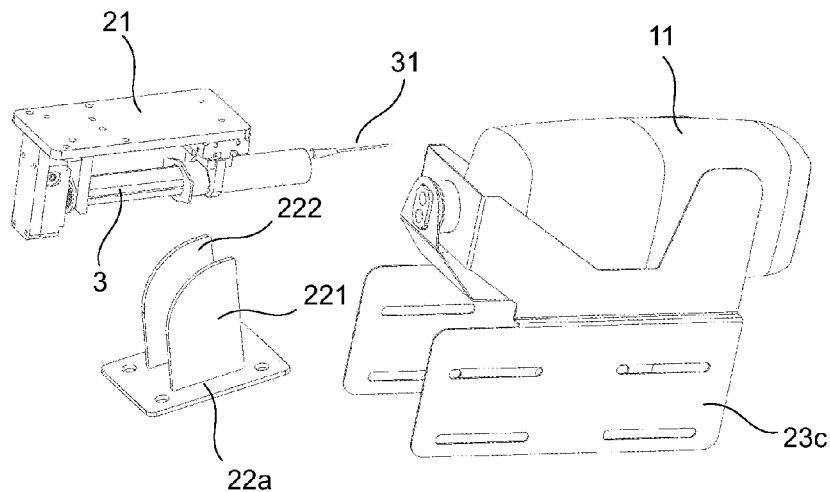
Figure 8B:
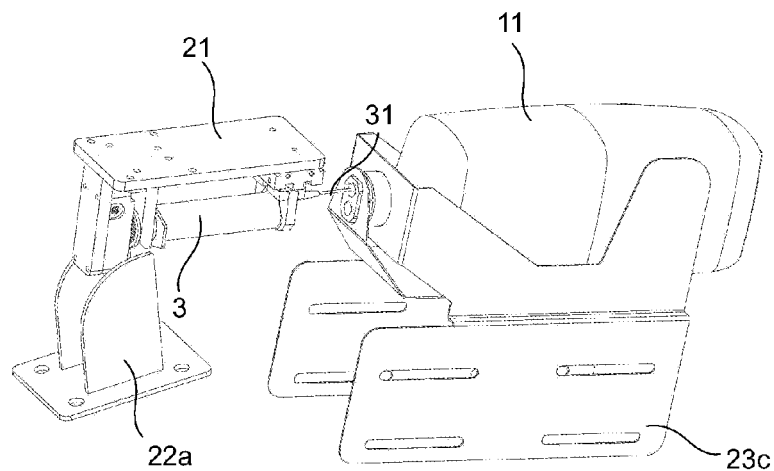
Figure 8C:
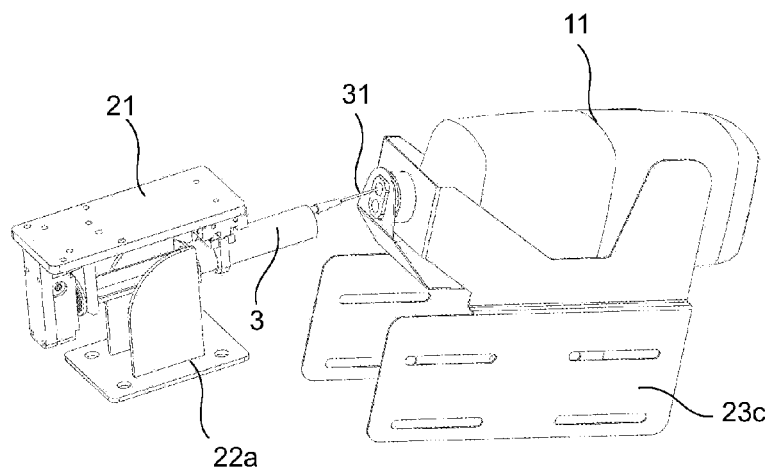

FIG. 8a shows how the gripper is used for gripping the medical syringe 3, and FIG. 8b shows how the medical syringe 3 is brought to the retaining member 22a, where an infusion bag 11 that contains sterilized water is placed in the filling receptacle holder 23c (in this case, separate from the retaining member). The retaining member 22a, the medical syringe 3 being placed between its flanges, is similar to the retaining member 8 in the embodiment of FIGS. 2a to 2c; in other words, the medical syringe is fitted between the flanges 221 and 222 in the retaining member 22a in such a way that the retaining collar or lugs 51 of the medical syringe 3 come behind the flanges 221 and 222 so that cylinder part 5 remains stationary when the plunger part 4 of the medical syringe 3 is moved outwards. As shown in FIG. 8c, the medical syringe 3 with the needle 31 therein is tilted in the suction phase by turning the gripper 21 while the plunger part 4 of the medical syringe 3 is moved by the gripper 21 backwards in relation to the cylinder part 4. After this step, the medical syringe 3 is brought to the retaining member 22b, in which the mixing receptacle 12 was placed before gripping the medical syringe 3.

Figure 9A:
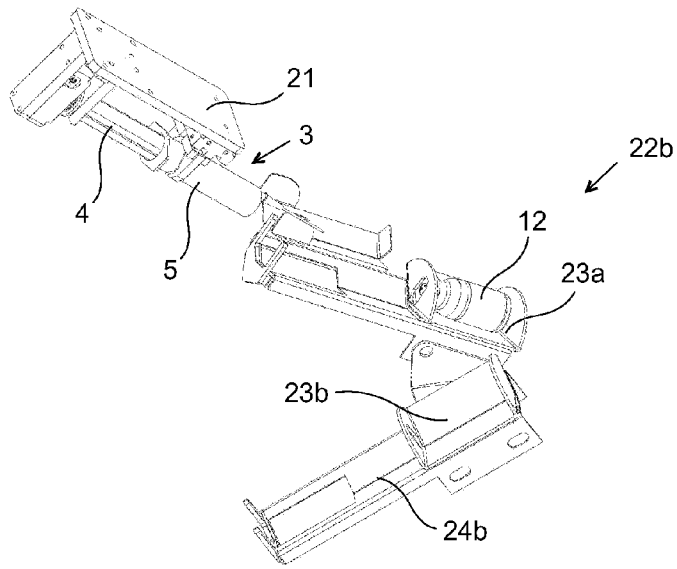
Figure 9B:
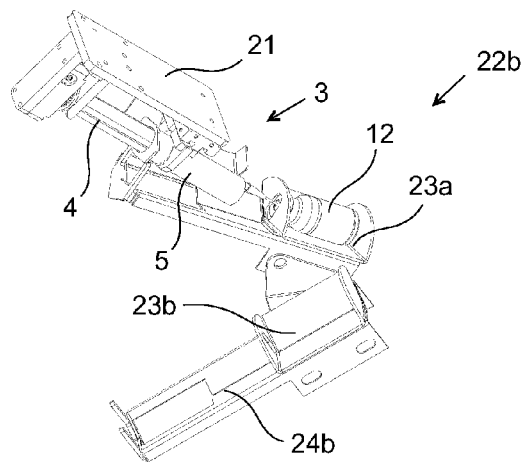
Figure 9C:
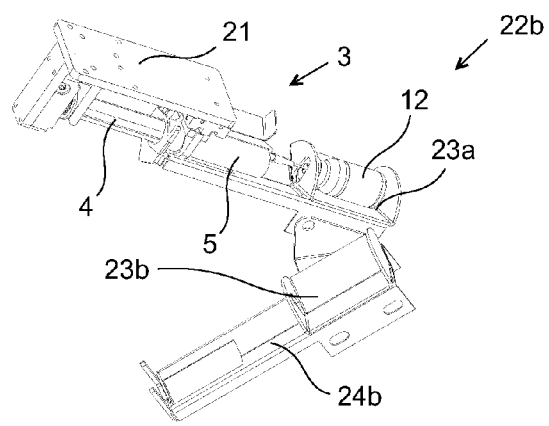

FIG. 9a shows the transfer of the medical syringe 3 to the retaining member 22b, and FIGS. 9b and 9c show the injection of sterilized water by the needle 31 of the medical syringe 3 into the mixing receptacle 12. After this step, the empty medical syringe 3 is placed in the medical syringe holder 26 of the retaining member 22b, and guiding jaws 211 are applied to grip the mixing receptacle 12, and the mixing step is taken. After the mixing, the mixing receptacle 12 is placed in the emptying holder 23b.

Figure 10A:
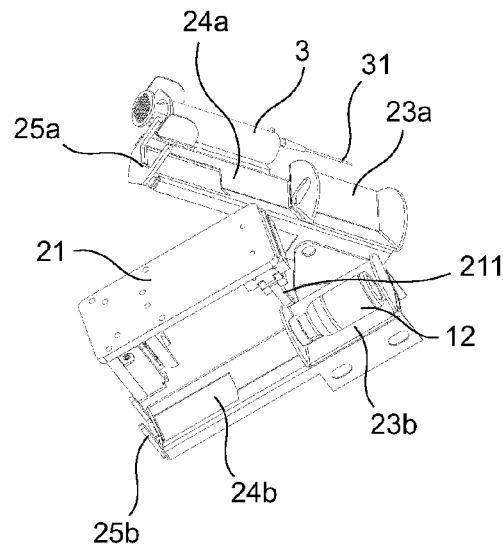
Figure 10B:
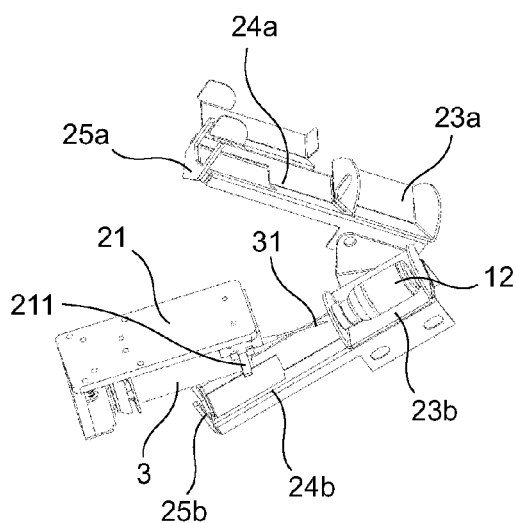
Figure 10C:
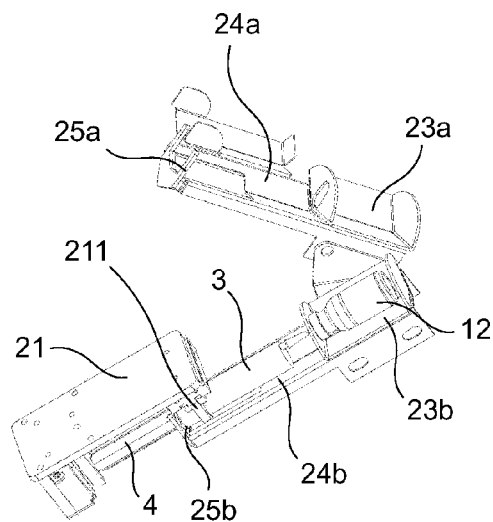

FIGS. 10a to 10c show the drawing of the liquid pharmaceutical substance, dissolved in sterilized water, back into the medical syringe 3. FIG. 10a shows how the gripper 21 is used to re-grip the medical syringe 3 in the medical syringe holder 26. FIG. 10b shows how the medical syringe 3 is brought to the mixing receptacle 12 in the emptying holder 23b of the retaining member 22b, and FIG. 10c shows how the pharmaceutical substance dissolved in sterilized water is drawn back into the medical syringe by moving the plunger part 4 of the medical syringe backwards. The U-shaped groove at one end of the support 24b connected to the front side of the emptying holder 23b is similar to the U-shaped groove at the other end of the support 24a connected to the front side of the filling holder 23a. The only difference is that when the medical syringe is used by means of the retaining member 22b, in the case of the emptying holder 23b the retaining lugs or collar 51 of the medical syringe 3 are placed on the rear side of the wall of the U-shaped groove 25b (that is, on the side of the emptying holder 23b), and in the case of the filling holder 23a on the front side of the U-shaped groove 25a (that is, on the opposite side of the walls of the U-shaped groove with respect to the filling holder 23a).

Figure 11:
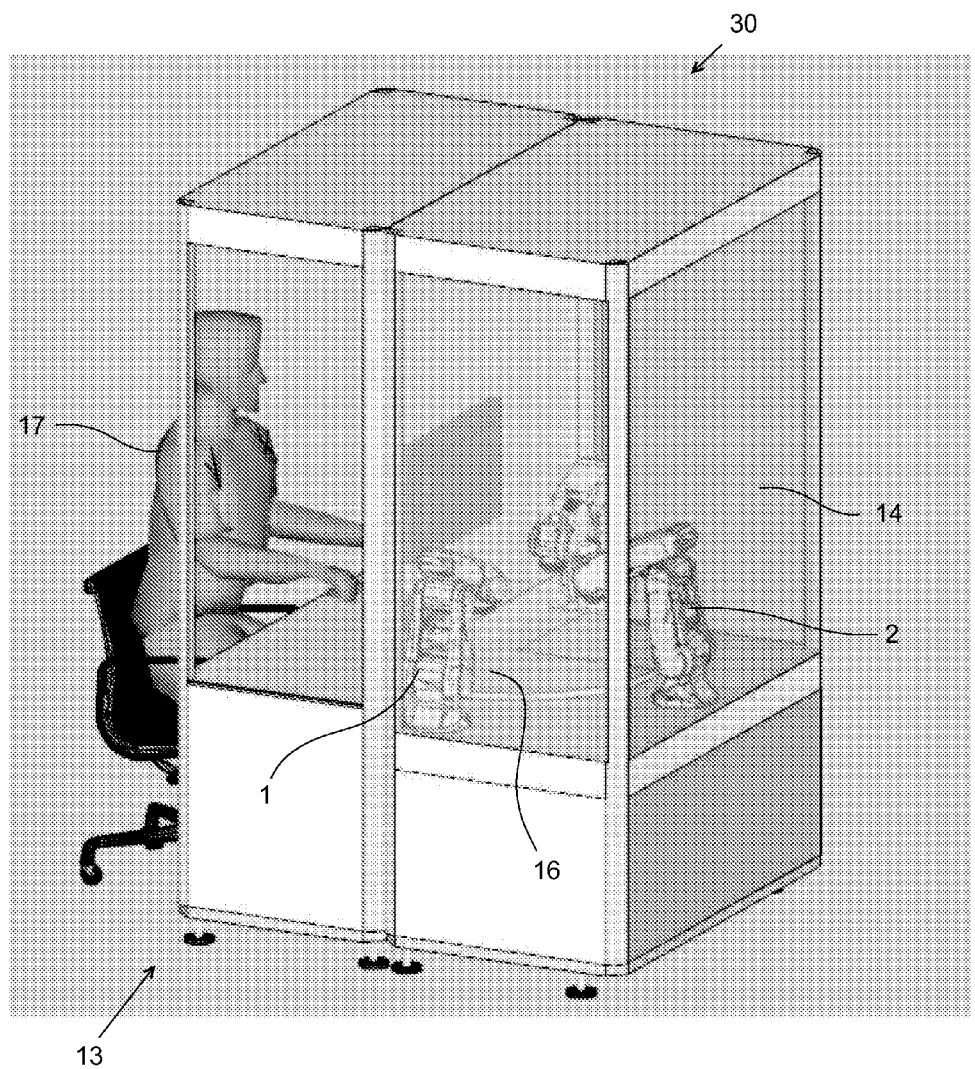
FIG. 11 shows a medical syringe filling station equipped with two industrial robots, wherein powdered or pulverized pharmaceutical substance is dissolved in a liquid in mixing receptacles, and in which the dissolved pharmaceutical substance in liquid form is transferred from the mixing receptacles to medical syringes.

FIG. 11 shows a medical syringe filling station equipped with two industrial robots, wherein a powdered or pulverized pharmaceutical substance is dissolved in a liquid in mixing receptacles 12, and wherein the dissolved pharmaceutical substance in liquid form is transferred from the mixing receptacles 12 to the medical syringes 3. It comprises a work place 13 with a closed sterile space 14 equipped with ventilation (that is, e.g. a laminar flow cabinet). Inside the sterile space 14, two industrial robots (first robot 1 and second robot 2) are provided, equipped with e.g. grippers 6 and 18 according to FIGS. 3a to 3c and 4a to 4c, or a single industrial robot equipped with a gripper 21 according to FIGS. 7a to 7c, 8a to 8c, 9a to 9c, and 10a to 10c, and a work top 15 which comprises a swivelling table 16, by which the mixing receptacles 12 (that is, e.g. flasks) equipped with a puncturable cap, and the medical syringes 3 can be transferred to the closed sterile inner space 14 without bringing the hands inside the space. The industrial robots 1 and 2 are responsible for all the steps taken inside the sterile space 14. The medical syringe 3 can be used, for example, in the way shown in FIGS. 2a to 2c, 3a to 3c, and 4a to 4c, or in FIGS. 7a to 7c, 8a to 8c, 9a to 9c, and 10a to 10c.

Typically, there are one or more (e.g. five) medical syringes 3 and mixing receptacles 12 connected to each other in a row so that the industrial robots 1 and 2 can handle all the medical syringes 3 and the mixing receptacles 12 at the same time. Dissolving the pharmaceutical substance in sterilized water and filling the medical syringes 3 with the pharmaceutical substance dissolved in water are performed by the apparatus of FIG. 11 when the medical syringe is used according to FIGS. 2a to 2c, 3a to 3c, 4a to 4c, and 5a to 5c, for example in the following way:

The medical syringes 3 enclosed in an air-tight package as well as the mixing receptacles containing the powdered or pulverized pharmaceutical substance are placed on the swivelling table 16 by the user 17 responsible for the operation who then turns the swivelling table 16 so that the medical syringes 3 and the mixing receptacles 12 are moved inside the sterile space 14. The first robot 1 picks up the medical syringes 3 from the swivelling table 16 and removes their package. Next, the first robot 1 grips the medical syringes 3 at their plunger parts 4 and draws sterilized water into the medical syringes 3 (e.g. in the way shown in FIGS. 2a to 2c) from a filling receptacle 11 that contains sterilized water and is placed in a suitable location inside the sterile space 14. The retaining members used here can be, for example, retaining members 8 according to FIGS. 2a to 2c, several of them fixed adjacent to each other, or a retaining member 9 of the type shown in FIGS. 3a to 3c having a number of U-shaped grooves 91 adjacent to each other at suitable spaces, the number being equal to the number of medical syringes 3 in the gripper of the first robot 1. The retaining member(s) 9 is held in place by the second robot 2, or it can be ready fixed by a suitable way to e.g. the sterilized water filling receptacle or a stationary structure at this location so that the first robot 1 can support the cylinder parts 5 of the medical syringes 3 to the retaining member 9 simultaneously when it moves the plunger parts 4 of the medical syringes 3 outwards, the needles 52 being inserted in the filling receptacles 11. Typically, for example about 20 ml of sterilized water is taken into the medical syringes. After this, the second robot 2 picks up the mixing receptacles 12 and moves them into the gripping range of the first robot 1 and turns them to a suitable position so that the first robot 1 can puncture the needles 52 of the medical syringes 3 through the puncturing points 122 in the caps 121 of the mixing receptacles 12. After this, the first robot 1 moves the medical syringes 3 in such a way that the needles 52 of the medical syringes 3 penetrate through the puncturing points 122 in the caps 121 of the mixing receptacles 12 in corresponding locations in the gripper 18 of the second robot 2, and pushes the plunger parts 4 of the medical syringes 3 so that the sterile water in the medical syringes 3 is transferred to the mixing receptacles 12. The cylinder parts 5 of the medical syringes 3 are held in place, for example by means of a retaining plate comprising one or more U-shaped grooves 91 as shown in FIGS. 3a to 3c and 4a to 4c, during the movement of the plunger parts 5 of the medical syringes 3. Next, the first robot 1 pulls the needles 52 of the medical syringes 3 out of the mixing receptacles 12 and moves the medical syringes 3 out of the range of movement of the second robot 2. After this, the second robot 2 starts to shake the mixing receptacles 12. The shaking is done, for example, so that the second robot 2 swivels its turnable wrist back and forth so that the mixing receptacles are turned upside down and the right way up again. The shaking takes e.g. about 0.5 to 3 minutes (advantageously about 1 minute), after which the solution in the mixing receptacles is allowed to settle for e.g. 5 to 15 seconds. After the mixing step, the first robot 1 takes the medical syringes 3 back to the vicinity of the caps 121 of the mixing receptacles 12 so that the tips of the needles 52 come against the puncturing points 122 of the caps 121. After this, it transfers the pharmaceutical substance dissolved in water back to the medical syringes 3 so that a desired quantity (for example about 20 ml) of the pharmaceutical substance is transferred back to the medical syringes. Next, the first robot 1 removes the needles 52 from the medical syringes 3 and places the medical syringes 3 on the swivelling table. The needles 52 are removed by, for example, a needle removal member 93 shown in FIG. 5a; in other words, the first robot 1 inserts the needles 52 in the slots or holes in the needle removal member and turns (and pulls) the medical syringes 3 so that the needles 52 come off. In the meantime, the second robot 2 has removed the empty mixing receptacles 12 for disposal (for example via a hatch in the wall of the sterile space). While the medical syringes 3 have been filled by the industrial robots 1 and 2, the next medical syringes 3 and mixing receptacles 12 that contain powdered or pulverized pharmaceutical substance have already been placed on the swivelling table 16 outside the sterile space 14 by the user 17. After the first robot 1 has placed the filled medical syringes 3 on the swivelling table 16 on the side of the sterile space 14, the user swivels the swivelling table 16 so that the medical syringes 3 filled with the liquid pharmaceutical substance are moved outside the sterile space 14 (on the user's side) and the new empty medical syringes 3 and the new mixing receptacles 12 that contain powdered or pulverized pharmaceutical substance are moved inside the sterile space 14. After this, the industrial robots (the first robot 1 and the second robot 2) inside the sterile space 14 start to dissolve the pharmaceutical substances contained in the next mixing receptacles 12 in sterile water, and to fill the medical syringes 3 in the above described way. Simultaneously with this, the user puts plug seal caps (not shown in the figures) in place of the needles at the tips of the preceding medical syringes, to prevent contamination of the pharmaceutical substance in the medical syringes 3. Moreover, outside the sterile space 14, the user equips the cylinder parts 5 of the medical syringes 3 with labels containing data on the pharmaceutical substance and possibly data on the patient to whom said pharmaceutical substance is to be administered. Thus, the dissolving of pharmaceutical substances transferred to the sterile space 14 and the process of filling the medical syringes 3 can be continued in the above described way as a continuous process as long as there are medical substances to be dissolved and transferred into medical syringes 3.

In the medical syringe filling station shown in FIG. 11, it is also possible to use the apparatus shown in FIG. 6 and FIGS. 7a to 7c, 8a to 8c, 9a to 9c, and 10a to 10c. Thus the filling of medical syringes takes place otherwise in the same way as presented above, but the use of the medical syringes takes place in the way shown in FIGS. 7a to 7c, 8a to 8c, 9a to 9c, and 10a to 10c, and in the way described in the description corresponding to these figures.

The method and the apparatus according to the invention for using medical syringes can be implemented, in many respects, in a way different from the above described example embodiment. For example, the retaining member used for keeping the cylinder part of the medical syringe can be implemented in various ways different from the embodiments presented above. A retaining member keeping several adjacent medical syringes in place can comprise, for example, an elongated piece provided with pins at regular intervals, between which pins the medical syringe is fitted on either side of the pins, depending on whether the plunger part of the medical syringe is to be moved inwards or outwards. Also, the grippers used in industrial robots can be implemented in various ways. A gripper for gripping the plunger part of a medical syringe could be implemented, for example, in such a way that the respective gripping jaws movable against each other are semi-circular in shape so that their curvature corresponds to the curvature of the flange at the end of the plunger part. The inner surface of such gripping jaws is provided with a curved flange groove that is clearly shallower than that presented above, the edge of the flange being received in the groove. Thus, the plunger part of the medical syringe, and thereby also the whole medical syringe, cannot turn in the direction of a plane parallel to its longitudinal direction. Also, the turning of the flange in relation to the longitudinal direction of the medical syringe could be prevented by providing the bottom of the groove in the gripping jaws with e.g. a cogging or another surface profile that enhances friction. Also, many other parts of the apparatus can be implemented in many different ways to provide an apparatus suitable for implementing the method according to the invention. Consequently, the invention is not limited to the example embodiments presented above, but it may vary within the scope of the appended claims.

The invention claimed is:

1. A method for using a medical syringe, in which method the medical syringe comprises a cylinder part with retaining lugs or a retaining flange and a needle, and a plunger part which is movable within the cylinder part by moving a plunger rod extending outside the cylinder part with respect to the cylinder part, and the method comprising the steps of:
    a) providing an industrial robot comprising an arm with multiple degrees of freedom and having a gripper at a distal end of the arm;
    b) gripping the plunger part by the gripper configured to prevent the plunger part from turning with respect to the gripper, at least in direction of a plane parallel to longitudinal direction of the plunger part,
    c) holding the syringe only by the gripper gripping the plunger part,
    d) tilting the syringe as desired by moving the robot arm to turn the gripper, and
    e) moving the plunger part with respect to the cylinder part either outwards for drawing liquid into the syringe or inwards for injecting the liquid of the syringe by moving the robot arm.

2. The method according to claim 1, wherein the cylinder part is supported at its retaining lugs or flange to a retaining member that does not compress the cylinder part, to prevent the movement of the cylinder part at least in the direction of movement of the plunger part when the plunger part is moved.

3. The method according to claim 2, wherein the cylinder part is supported by the retaining member that also supports the cylinder part in at least one direction perpendicular to the direction of movement of the plunger part.

4. The method according to claim 3, wherein the retaining member supports the cylinder part from two directions different from each other and perpendicular to the direction of movement of the plunger part.

5. The method according to claim 2, wherein the plunger part is gripped by a gripper fastened to the arm of a first industrial robot, the retaining member being fastened to a gripper fastened to an arm of a second industrial robot.

6. The method according to claim 2, wherein the retaining member is fastened to a stationary structure.

7. An apparatus for using a medical syringe comprising a plunger rod and a cylinder part, the apparatus comprising:
    at least one industrial robot arm having multiple degrees of freedom, and comprising a gripper at a distal end of the arm, wherein the gripper is configured to hold the syringe by gripping it only from a drive flange of the plunger rod,
        the gripper comprising fingers with flange grooves arranged to receive the drive flange at end of the plunger rod by moving the fingers against each other to clamp the drive flange in an immovable way so that the plunger rod cannot turn or move with respect to the gripper,
    wherein the apparatus is configured to move the plunger rod with respect to the cylinder part by moving the at least one industrial robot arm and the syringe can be freely tilted.

8. The apparatus according to claim 7, wherein the apparatus further comprises at least one retaining member against which retaining lugs or a flange of the cylinder part are configured to be placed to prevent a movement of the cylinder part at least in a direction of movement of the plunger rod when the medical syringe is moved against the retaining member by holding the plunger part by the arm of the industrial robot.

9. The apparatus according to claim 8, wherein the retaining member comprises a web and two parallel flanges extending from the web and spaced from each other by a distance that is equal to or greater than a diameter of the cylinder part of the medical syringe but smaller than largest diameter of the retaining lugs or flange of the cylinder part.

10. The apparatus according to claim 8, wherein the retaining member comprises a piece made of a sheet-like material and at least one U-shaped groove whose width is equal to or greater than a diameter of the cylinder part of the medical syringe but smaller than largest diameter of the retaining lugs or flange of the cylinder part.

11. A method for dissolving a powdered or pulverized pharmaceutical substance in a liquid, the method comprising:
    adding liquid to the powdered or pulverized pharmaceutical substance in a mixing receptacle by a medical syringe with a needle which is inserted in the mixing receptacle through a puncturing point in its cap, the medical syringe being actuated by an apparatus of claim 7;

drawing the needle of the medical syringe outside the mixing receptacle;

shaking the mixing receptacle to mix the pharmaceutical substance and the liquid;

removing the pharmaceutical substance from the mixing receptacle by drawing it back to the medical syringe and wherein the medical syringe is actuated by the apparatus of claim 7.

12. The method according to claim 11, wherein the needle is removed from the medical syringe and replaced by a cap.

13. The method according to claim 11, wherein the medical syringe is provided with a label that contains data on the pharmaceutical substance and/or a patient.

14. An apparatus for dissolving in a receptable a powdered or pulverized pharmaceutical substance in a liquid, the apparatus comprising:

a first industrial robot arm having multiple degrees of freedom, and comprising a gripper at a distal end of the arm, wherein the gripper is configured to hold the syringe by gripping it only from a drive flange of the plunger rod, the gripper comprising fingers with flange grooves arranged to receive the drive flange at end of the plunger rod by moving the fingers against each other to clamp the drive flange in an immovable way so that the plunger rod cannot turn or move with respect to the gripper, wherein the plunger rod is movable with respect to the cylinder part by movement of the industrial robot arm to inject liquid into the receptacle, and the syringe can be freely tilted; and a second industrial robot arm configured to shake and mix the receptable.

15. The apparatus of claim 14, wherein the first industrial robot arm is configured to draw back dissolved pharmaceutical substance from the receptable.

* * * * *